United States Patent
Maab et al.

(10) Patent No.: US 10,919,002 B2
(45) Date of Patent: Feb. 16, 2021

(54) FLUORINATED POLYTRIAZOLE MEMBRANE MATERIALS FOR GAS SEPARATION TECHNOLOGY

(71) Applicant: Saudi Arabian Oil Company, Dhahran (SA)

(72) Inventors: Husnul Maab, Dhahran (SA); Eyad A. Qasem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 353 days.

(21) Appl. No.: 16/114,676

(22) Filed: Aug. 28, 2018

(65) Prior Publication Data
US 2020/0070107 A1    Mar. 5, 2020

(51) Int. Cl.
*B01D 71/82*    (2006.01)
*B01D 71/72*    (2006.01)
*C08G 61/12*    (2006.01)

(52) U.S. Cl.
CPC ............. *B01D 71/82* (2013.01); *B01D 71/72* (2013.01); *C08G 61/123* (2013.01);
(Continued)

(58) Field of Classification Search
CPC .... B01D 71/82; B01D 71/72; B01D 2256/10; B01D 2256/245; B01D 2257/11; B01D 2257/304; B01D 2257/504; B01D 2325/20; B01D 2325/34; B01D 2325/22; B01D 2325/24; B01D 2325/30; B01D 71/62; B01D 53/228; B01D 69/02; B01D 71/32;
(Continued)

(56) References Cited

U.S. PATENT DOCUMENTS 3,773,544 A    11/1973    Newton et al.
4,119,593 A    10/1978    Smith et al.
(Continued)

FOREIGN PATENT DOCUMENTS

AT    441688 T    9/2009
AT    527303 T    10/2011
(Continued)

OTHER PUBLICATIONS

Chisca et al., "Crosslinked copolyazoles with a zwitterionic structure for organic solvent resistant membranes", the Royal Society of Chemitry, Polym. Chem. 6, pp. 543-554, 2015.
(Continued)

*Primary Examiner* — Thuan D Dang
(74) *Attorney, Agent, or Firm* — Dinsmore & Shohl LLP

(57)    ABSTRACT

Polymer membranes include a polymer material that is selectively permeable to acidic gases over methane in a gas stream, such as natural gas. The polymer material may be a polymer membrane comprising a fluorinated polytriazole polymer. The fluorinated polytriazole polymer may further comprise a substituted phenyl or a substituted benzenaminyl. The substituted phenyl or substituted benzenaminyl may be substituted with hydrogen, bromo, fluoro, chloro, iodo, hydroxy, methyl, trifluoromethyl, dimethylamino, tert-butyl, or difluoromethoxy groups. The polymer material may have a degree of polymerization of from 100 to 175. The polymer membranes may be incorporated into systems or methods for removing separable gases, such as acidic gases, from gas streams, such as natural gas.

24 Claims, 4 Drawing Sheets

(52) U.S. Cl.
CPC .... *B01D 2256/10* (2013.01); *B01D 2256/245* (2013.01); *B01D 2257/11* (2013.01); *B01D 2257/304* (2013.01); *B01D 2257/504* (2013.01); *B01D 2325/20* (2013.01); *B01D 2325/34* (2013.01); *C08G 2261/146* (2013.01)

(58) Field of Classification Search
CPC . C08G 61/123; C08G 2261/146; Y02C 20/40
USPC ........ 585/818; 95/45, 47, 48, 49, 50, 51, 53, 95/55; 96/14
See application file for complete search history.

(56) References Cited

U.S. PATENT DOCUMENTS

| | | | |
|---|---|---|---|
| 5,698,663 | A | 12/1997 | Kinneberg |
| 5,837,032 | A | 11/1998 | Moll et al. |
| 5,959,058 | A | 9/1999 | Tonelli et al. |
| 6,503,295 | B1 | 1/2003 | Koros et al. |
| 6,911,512 | B2 | 6/2005 | Jing et al. |
| 7,208,243 | B2 | 4/2007 | Li et al. |
| 7,691,515 | B2 | 4/2010 | Li et al. |
| 7,745,512 | B2 | 6/2010 | Xia et al. |
| 7,872,071 | B2 | 1/2011 | Berthhold et al. |
| 7,989,579 | B2 | 8/2011 | Ponce et al. |
| 8,026,337 | B2 | 9/2011 | Ponce et al. |
| 8,309,228 | B2 | 11/2012 | Dierdorf et al. |
| 8,415,447 | B2 | 4/2013 | Rydin et al. |
| 8,679,632 | B2 | 3/2014 | Smith |
| 8,816,003 | B2 | 8/2014 | Liu et al. |
| 8,911,840 | B2 | 12/2014 | Leiden et al. |
| 9,233,344 | B1 | 1/2016 | Liu et al. |
| 9,403,120 | B2 | 8/2016 | Okamoto et al. |
| 9,718,031 | B2 | 8/2017 | Ma et al. |
| 9,751,053 | B2 | 9/2017 | Liu et al. |
| 10,053,598 | B2 | 8/2018 | Yalcin et al. |
| 2003/0154129 | A1 | 8/2003 | Goff |
| 2007/0155953 | A1 | 7/2007 | Li et al. |
| 2008/0182964 | A1 | 7/2008 | Ponce et al. |
| 2008/0193652 | A1 | 8/2008 | De Figueiredo Gomes et al. |
| 2008/0317946 | A1 | 12/2008 | Chen |
| 2009/0318620 | A1 | 12/2009 | Liu et al. |
| 2010/0043906 | A1 | 2/2010 | Jackson et al. |
| 2010/0168376 | A1 | 7/2010 | Ponce et al. |
| 2010/0270234 | A1 | 10/2010 | Liu et al. |
| 2010/0326273 | A1 | 12/2010 | Liu et al. |
| 2011/0071268 | A1 | 3/2011 | Hays et al. |
| 2012/0322911 | A1 | 12/2012 | Liu et al. |
| 2012/0323059 | A1 | 12/2012 | Liu et al. |
| 2013/0206694 | A1 | 8/2013 | Nunes et al. |
| 2015/0368496 | A1 | 12/2015 | Hawig |
| 2016/0089640 | A1 | 3/2016 | Liu et al. |
| 2016/0303521 | A1 | 10/2016 | Chakraborty et al. |
| 2016/0329534 | A1 | 11/2016 | Flynn et al. |
| 2017/0157555 | A1 | 6/2017 | Karode et al. |
| 2017/0157556 | A1 | 6/2017 | Karode et al. |
| 2017/0157557 | A1 | 6/2017 | Ding et al. |
| 2017/0327677 | A1 | 11/2017 | Neuteboom et al. |

FOREIGN PATENT DOCUMENTS

| | | |
|---|---|---|
| CA | 2619814 A1 | 7/2008 |
| CA | 2620696 A1 | 8/2008 |
| CN | 101235147 A | 8/2008 |
| CN | 101244416 A | 8/2008 |
| CN | 102558555 A | 7/2012 |
| DE | 102007005666 A1 | 8/2008 |
| DE | 102007007879 A1 | 8/2008 |
| DE | 102008024344 A1 | 12/2008 |
| DK | 1953186 T3 | 1/2010 |
| EP | 1953186 A1 | 8/2008 |
| EP | 1978052 A1 | 10/2008 |
| EP | 2236542 A1 | 10/2010 |
| EP | 2626127 A2 | 8/2013 |
| EP | 2667441 | 11/2013 |
| GR | 1006508 B | 9/2009 |
| JP | 2008522014 A | 6/2008 |
| JP | 2008189921 A | 8/2008 |
| JP | 2008194687 A | 8/2008 |
| JP | 20098004367 A | 1/2009 |
| JP | 2011168779 A1 | 9/2011 |
| KR | 20060023450 A | 3/2006 |
| KR | 20080071935 A | 8/2008 |
| WO | 9404253 A2 | 3/1994 |
| WO | 2006060556 A2 | 6/2006 |

OTHER PUBLICATIONS

Chisca et al., "Crosslinked polytrizaole membranes for organophilic filtration", Journal of Membrane Science, vol. 528, pp. 264-272, 2017.

Gomes et al., "Synthesis and characterization of flexible polyoxadiazole films through cyclodehydration of polyhydrazides", Polymer 44, pp. 3633-3639, 2003.

Hensema et al., "Polyoxadiazoles and polytriazoles as new heat and solvent resistant membrane materials", Bull. Soc. Chlm. Belg. vol. 100, No. 2, pp. 129-136, 1991.

Hensema et al., "Gas separation properties of new polyoxadiazole and polytriazole membranes", Gas Separation & Purification, vol. 8, No. 3, pp. 149-160, 1994.

Hensema, "Polymeric Gas Separation Membranes", Advanced Materials, vol. 6, No. 4, pp. 269-279, 1994.

Maab et al., "Synthesis and fabrication of nanostructured hydrophobic polyazole membranes for low-energy water recovery", Journal of Membrane Science 423-424, pp. 11-19, 2012.

Maab et al., "Porous polyoxadiazole membranes for harsh environment", Journal of Membrane Science 445, pp. 127-134, 2013.

Maab et al., "Polyazole Hollow Fiber Membranes for Direct Contact Membrane Distillation", American Chemical Society,Ind. Eng. Chem. Res, vol. 52, pp. 10425-10429, 2013.

Matar et al., "Temporal Changes in Extracellular Polymeric Substances on Hydrophilic Membrane Surfaces in a Submerged Membrane Bioreactor", Water Research, vol. 95, pp. 27-38, 2016.

Perepelkin et al., "Highly Heat-Resistant Polyoxadiazole Fibres and arselon Filament: Principles of Manufacture, Properties, and use. An Analytical Review", Fibre Chemistry, vol. 40, No. 5, pp. 406-414, 2008.

Robeson, "Correlation of separation factor versus permeability for polymeric membranes", Journal of Membrane Science, vol. 62, pp. 165-185, 1991.

Robeson, "The upper bound revisited", Journal of Membrane Science, vol. 320, pp. 390-400, 2008.

Schulz et al., "Aramatic Poly(1,3,4-oxadiazole)s as Advanced Materials", Advanced Materials, vol. 9, No. 8, pp. 601-613, 1997.

Gebben et al., "Gas Separation Properties of Thermally Stable and Chemically Resistant Polytriazole Membrane" Journal of Membrane Science, Elsevier BV, NL, vol. 46, No. 1, Sep. 1, 1989, pp. 29-41.

International Search Report and Written Opinion dated May 24, 2019 pertaining to International application No. PCT/US2018/060650, 17 pgs.

Mirza et al., "Surface Coatings on Steel Pipes Used in Oil and Gas Industries—a Review", American Chemical Science Journal, 13(1): 1-23, Article No. ACSJ.22790, 2016.

FLUORINATED POLYTRIAZOLE MEMBRANE MATERIALS FOR GAS SEPARATION TECHNOLOGY

BACKGROUND

Field

The present specification generally relates to polymer membranes and to systems and methods incorporating the polymer membranes to separate gases, more particularly to fluorinated polytriazole membranes for removing separable gases from gas stream, such as a natural gas stream, to gas separation systems incorporating the fluorinated polytriazole membranes, and to methods of separating separable gases from a gas stream, such as a natural gas stream, using the fluorinated polytriazole membranes.

Technical Background

Raw natural gas is often saturated with separable gases, such as acidic gases, that must be separated and removed from the natural gas before the natural gas can be piped. Separable gases generally include any acidic gaseous compounds that form acidic solutions when dissolved in water, such as hydrogen sulfide ($H_2S$), carbon dioxide ($CO_2$), and other gases capable of forming acidic solutions in water. The current membrane separation technologies involve time-consuming blending or treatment processes to achieve suitable mixture levels. The removal of undesirable separable gases is currently a focus for volume and efficiency in natural gas processing. Accordingly, there are ongoing needs for separation membrane materials for acidic gas removal. Such polymer membranes should exhibit increased permeability toward the acidic gases and selectivity to the acidic gases over light hydrocarbons such as methane.

SUMMARY

According to some embodiments of this disclosure, a gas separation system comprising a polymer membrane includes a polymer membrane in fluidic communication with a gas stream that contains a mixture of at least two separable gases. The polymer material includes a fluorinated polytriazole polymer according to formula (I):

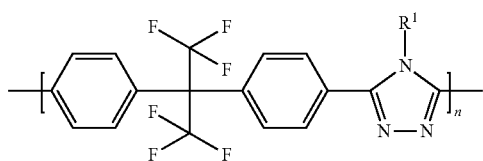

(I)

In formula (I), each $R^1$ is a substituted phenyl or a substituted benzenaminyl. The substituted phenyl or substituted benzenaminyl $R^1$ may be substituted with groups independently selected from hydrogen, bromo, fluoro, chloro, iodo, hydroxy, methyl, trifluoromethyl, dimethylamino, tert-butyl, or difluoromethoxy, provided that one of the substituents is not hydrogen. In some examples, the degree of polymerization (i.e., subscript n) of the fluorinated polytriazole polymer may be from 100 to 175. In some embodiments, the polymer membrane has an average molecular weight of 50 kg/mol to 75 kg/mol.

According to further embodiments, systems for removing separable gases from a gas stream may include at least one polymer membrane having the fluorinated polytriazole polymer according to formula (I). The systems may include a separator unit comprising an inlet, a retentate outlet, and a permeate outlet; and a gas stream in fluidic communication with the inlet of the separator unit, the gas stream comprising a mixture of at least two separable gases. The polymer membrane may be configured within the separator unit to such that only permeates can flow from the inlet to the permeate outlet after first passing through the membrane and such that retentates flow from the inlet to the retentate outlet without passing through the membrane. The systems further include a retentate collector in fluidic communication with the retentate outlet of the separator unit; and a permeate collector in fluidic communication with the permeate outlet of the separator unit.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
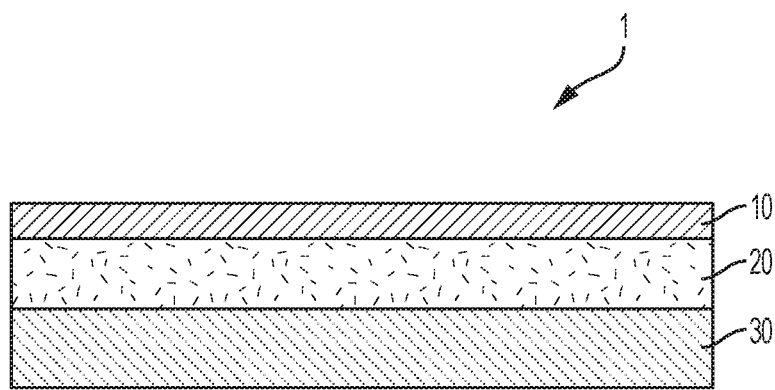
FIG. 1 is a cross sectional schematic diagram of a polymer membrane according to embodiments.

Polymeric membranes are common membranes used in gas separation processes. Gas transport through polymer membranes follows a solution-diffusion mechanism. Polymer membranes are in general diffusivity selective, and preferentially permeate larger gases such as helium (He) and carbon dioxide ($CO_2$) over smaller gases such as nitrogen ($N_2$) and methane ($CH_4$). Various membranes have received considerable attention and long utilization industrially as special membrane materials for the separation of natural gas. However, such polymer membranes tend to require additional blending and treatments that are time intensive and lead to plasticization of the membrane. Therefore, new materials for commercial separation of separable gases, such as acidic gases, are particularly desired as they have greater permeability of acidic gases and greater selectivity of acidic gases over methane, while also showing strong anti-plasticization properties in high-pressure systems.

In general, polymer membranes separate components of a gas stream because the components permeate the membrane at different rates. The permeability, P, of a polymer membrane material for a gas is the rate at which that gas moves through a standard thickness (1 cm) of the membrane under a standard driving force (a pressure difference of 1 cmHg). A measure of the ability of a membrane to separate two gases is the selectivity, a, defined as the ratio of the gas permeabilities, $P_1/P_2$. Both high permeability and high selectivity are desirable characteristics of polymer membranes for separation, because a higher permeability decreases the size of membrane necessary to treat a given amount of gas, while higher selectivity results in a more highly purified product. The polymer membranes according to embodiments have permeability and selectivity characteristics for use in separation of acidic gases from natural gas.

According to embodiments of this disclosure, polymer membranes for separating separable gases from a gas stream include polymer materials having functionality and fluorinated polytriazole structures that are believed to impart higher permeability to separable gases, such as acidic gases, and higher selectivity to acidic gases over lighter components of a gas stream than is commonly realized in conventional polymer membranes.

Accordingly, reference will now be made in detail to embodiments of polymer membranes that include a polymer material that is selectively permeable to separable gases, such as acidic gases, over small-molecule components of natural gas such as methane and nitrogen, for example. Embodiments of systems incorporating the polymer membranes for separating acidic gases from gas streams, and methods for separating acidic gases from gas streams using a system incorporating the polymer membranes, will be disclosed subsequently.

The term "selectively permeable" means that separable gases, such as acidic gases, are capable of permeating the polymer membrane and that the acidic gases have a greater permeability through the polymer material than do the non-acidic gaseous components of natural gas.

Referring to FIG. 1, a polymer membrane 1 according to embodiments includes a polymer material 10. In some embodiments, the polymer material 10 may be a freestanding membrane having suitable mechanical characteristics for use of the polymer material 10 in a separation system. In other embodiments, the polymer material may be supported on a porous support layer 20 to provide additional mechanical suitability for use of the polymer membrane 1 in a separation system. The polymer material 10 may be coated onto the porous support layer 20 by conventional techniques such as casting or spin coating of a separation layer solution containing dissolved polymer, then drying and heat treating the dried polymer to crosslink the polymer material 10. Examples of materials for use as a porous support layer 20 include, but are not limited to polyacrylonitriles, poly(vinylidene fluorides), polycarbonates, polyamides, cellulose acetates, polymer sulfones, polyether ketones, polyetherether ketones, or polyether sulfones. The material of the porous support layer 20 may be a microporous polymer or copolymer. In some embodiments, additional mechanical stability may be imparted to the polymer membrane 1 by a base support 30. Suitable materials for the base support 30 may include nonwoven materials such as, but not limited to, poly(ethylene terephthalate), cellulose acetates, polyethylene, polypropylene, poly(alkylamides), or poly(aryl amides). Thus, in some embodiments, the polymer membrane 1 may include the polymer material 10, the base support 30 that provides structural support to the polymer material 10, and the porous support layer 20 is interposed between the polymer material 10 and the base support 30.

In illustrative embodiments, a polymer material 10 supported on a porous support layer 20 may have a thickness sufficient to block separable components, such as acidic components, of the natural gas while permitting non-acidic components to permeate the polymer material 10. For example, the polymer material 10 may have a thickness from 0.2 μm to about 100 μm, such as from 1 μm to 5 μm. The porous support layer 20 may have a thickness sufficient to remain physically intact when coated with the polymer material 10. For example, the porous support layer 20 may have a thickness from 10 μm to 100 μm or from 30 μm to 60 μm. A base support 30, when present, may have a thickness sufficient to impart the required mechanical support to the porous support layer 20 coated with the polymer material 10. For example, the base support 30 may have a thickness from 100 μm to 250 μm. Other dimensions such as length, width, and shape or geometry of the polymer membrane 1 as a whole may vary according to a desired end use and are limited only by customary constraints of operational feasibility and mechanical stability. The porous support layer 20 may be microporous. Examples of microporous supports include flat sheets of a microporous material and supports formed from hollow fibers.

The polymer membrane of the polymer material 10 will now be described. The polymer material 10 of the polymer membrane according to embodiments includes a fluorinated polytriazole polymer. It should be understood that in all representations of chemical structures in this disclosure, a wavy line drawn perpendicularly to a bond denotes a connection point of the chemical structure with another chemical structure or functional group and implies that the bond broken by the wavy line extends to another atom not shown in the representation.

In embodiments, the polymer material 10 may include a fluorinated polytriazole polymer according to general formula (I):

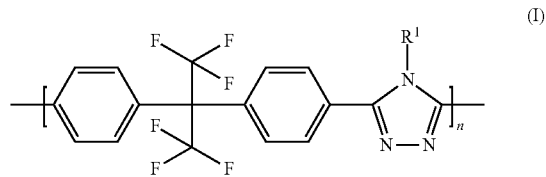

(I)

In formula (I), $R^1$ is a substituted phenyl or substituted benzenaminyl, which will be subsequently described in detail. The subscript n of formula (I) denotes the degree of polymerization of formula (I), based on the total number of monomer units per polymer molecule in the polymer membrane. In some embodiments, subscript n is from 10 to 850, from 100 to 175, or from 100 to 160.

Each monomer $R^1$ of the polymer material 10 is a substituted phenyl or a substituted benzenaminyl. Thus, the fluorinated polytriazole polymer of formula (I) may be characterized in some embodiments as a substituted fluorinated polytriazole polymer.

Each monomer $R^1$ of the polymer material 10 is independently chosen from substituted phenyl groups having formula (Ia) or substituted benzenaminyl groups having formula (Ib):

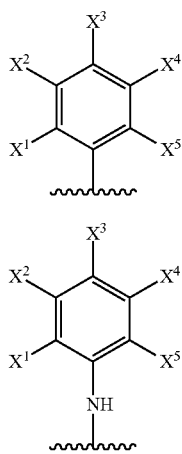

In both formula (Ia) and formula (Ib), $X^1$, $X^2$, $X^3$, $X^4$, and $X^5$ is independently selected from hydrogen, bromo, fluoro, chloro, iodo, hydroxy, methyl, trifluoromethyl, dimethylamino, tert-butyl, or difluoromethoxy, provided at least one of $X^1$, $X^2$, $X^3$, $X^4$, or $X^5$ is not hydrogen. In some embodiments, exactly one of $X^1$, $X^2$, $X^3$, $X^4$, and $X^5$ is independently selected from, bromo, fluoro, chloro, iodo, hydroxy, methyl, trifluoromethyl, dimethylamino, tert-butyl, or difluoromethoxy, and the remaining four of $X^1$-$X^5$ are hydrogen. In other embodiments, exactly two of $X^1$, $X^2$, $X^3$, $X^4$, and $X^5$ is independently selected from bromo, fluoro, chloro, iodo, hydroxy, methyl, trifluoromethyl, dimethylamino, tert-butyl, or difluoromethoxy, and the remaining three of $X^1$-$X^5$ are hydrogen. In other embodiments, $X^1$, $X^2$, $X^3$, $X^4$, and $X^5$ are independently selected from the group consisting of hydrogen, bromo, and fluoro, provided at least one of $X^1$, $X^2$, $X^3$, $X^4$, and $X^5$ is not hydrogen. In one embodiment, when $R^1$ is a substituted phenyl group according to formula (Ia), the group $X^3$ is not hydroxy.

In some embodiments, the polymer material may be a homopolymer, such that all groups $R^1$ in any given molecule of the polymer material 10 are identical.

Non-limiting specific examples of $R^1$ include 4-bromophenyl; 4-fluorophenyl; 4-hydroxyphenyl; 4-(difluoromethyl)phenyl; 2,3,4,5,6-pentafluorobenzenaminyl; 4-bromo-2,3,5,6-tetrafluorophenyl; 1,2,3,4,5-(pentafluoro)phenyl; 4-bromo-2,5-difluorophenyl; 4-bromo-2,6-difluorophenyl; 2,4-difluorophenyl; 2,5-difluorophenyl; 3-(trifluoromethyl)phenyl; 4-fluoro-3-(trifluoromethyl)phenyl; 4-tert-butylphenyl; 2,4,6-trimethylphenyl; 4-(dimethylamino)phenyl; 2,4,6-trimethylbenzenaminyl hydrochloride; 2,6-dichloro-4-(trifluoromethyl)benzenaminyl; 3,5-bis(trifluoromethyl)benzenaminyl; and 4-(hexadecylsulfonyl)benzenaminyl. In specific examples of the polymer of formula (I), each $R^1$ is selected from the group consisting of 4-bromophenyl; 4-fluorophenyl; 4-hydroxyphenyl; 4-(difluoromethyl)phenyl; 2,3,4,5,6-pentafluorobenzenaminyl; and 4-bromo-2,3,5,6-tetrafluorophenyl. In other examples, each $R^1$ is selected from the group consisting of 4-bromophenyl; 4-fluorophenyl; 4-(difluoromethyl)phenyl; 2,3,4,5,6-pentafluorobenzenaminyl; and 4-bromo-2,3,5,6-tetrafluorophenyl.

In some embodiments, each $R^1$ is a substituted phenyl according to formula (Ia). Examples of $R^1$ when $R^1$ is a substituted phenyl according to formula (Ia) include 4-bromophenyl; 4-fluorophenyl; 4-hydroxyphenyl; 4-(difluoromethyl)phenyl; 4-bromo-2,3,5,6-tetrafluorophenyl; 1,2,3,4,5-(pentafluoro)phenyl; 4-bromo-2,5-difluorophenyl; 4-bromo-2,6-difluorophenyl; 2,4-difluorophenyl; 2,5-difluorophenyl; 3-(trifluoromethyl)phenyl; 4-fluoro-3-(trifluoromethyl)phenyl; 4-tert-butylphenyl; 2,4,6-trimethylphenyl; and 4-(dimethylamino)phenyl.

In some embodiments, each $R^1$ is a substituted benzenaminyl according to formula (Ib). Examples of $R^1$ when $R^1$ is a substituted benzenaminyl according to formula (Ib) include 2,3,4,5,6-pentafluorobenzenaminyl; 2,4,6-trimethylbenzenaminyl hydrochloride; 2,6-dichloro-4-(trifluoromethyl)benzenaminyl; 3,5-bis(trifluoromethyl)benzenaminyl; and 4-(hexadecylsulfonyl)benzenaminyl.

As used throughout this disclosure, the terms "independently chosen from" or "independently selected from" means that for multiple instances of a variable group in a particular chemical structure or moiety, the identity of each individual instance does not depend on the identity of any other individual instance, subject only to any exceptions or provisos that are explicitly stated.

According to embodiments, in formula (I), subscript n is an integer from 10 to 850, from 10 to 500, from 50 to 250, from 75 to 200, from 100 to 175, from 100 to 160, from 110 to 160, from 110 to 150, from 115 to 150, from 115 to 145, from 120 to 145, from 120 to 145, from 120 to 140, or from 130 to 140.

In some embodiments, the polymer membrane according to formula (I) has an average molecular weight of 50 kg/mol to 75 kg/mol, from 55 kg/mol to 75 kg/mol, from 55 kg/mol to 70 kg/mol, from 60 kg/mol to 75 kg/mol, or from 60 kg/mol to 70 kg/mol, as determined by size exclusion chromatography.

The polymer membranes according to the embodiments previously described may be prepared by any suitable chemical reaction or sequence of reactions. In an exemplary synthetic approach, the polymer membranes may be prepared, for example, by a polycondensation reaction between hydrazine sulfate and 4,4'-(hexafluoroisopropylidene)bis (benzoic acid) under inert environment of $N_2$ gas and vigorous stirring for three hours. The resulting viscous polymer is then carefully precipitated into five liters of 1 M sodium hydroxide (NaOH) solution and washed in de-ionized water at 80° C. for 12 hours. The precipitated polyoxadiazole fibers may be collected by filtration and then vacuum dried at 110° C. for 12 hours. The polyoxadiazole polymer is then dissolved in N-methyl-2-pyrrolidone solvent and stirred under $N_2$ atmosphere as aniline derivative is added to the mixture. The reaction produces fluorinated polytriazole polymers. The polymers include modifications such as substituted phenyl or substituted benzenaminyl groups on a fluorinated polytriazole polymer. Polymer membranes are prepared from the resulting polymer by dissolving a polymer in chloroform solvent by magnetic stirring at 25° C. for about 24 hours. The solution is poured onto dry glass. Room temperature solvent evaporation followed by additional heat drying at 100° C. under vacuum for additional 24 hours results in a polymer membrane suitable for use in a gas separation system.

Thus, various embodiments of polymer membranes have been described. Embodiments of systems for removing heavy hydrocarbons from natural gas will now be described. The systems may include one or more than one polymer membrane according to any of the embodiments previously described.

In an embodiment, a gas separation system comprising a polymer membrane is in fluidic communication with a gas stream containing a mixture of at least two separable gases, the polymer membrane comprising a polymer according to formula (I), according to an embodiment previously described. The term "in fluidic communication with a gas stream" means that the polymer membrane is connected to a gas stream from a gas source, such that gas flowing from the gas source may contact or pass through the polymer membrane. In some embodiments, the gas stream comprises at least two separable gases, such as any mixture of nitrogen ($N_2$), methane ($CH_4$), helium (He), carbon dioxide ($CO_2$), hydrogen sulfide ($H_2S$), and ethane ($C_2H_6$). In some embodiments the gas stream may include natural gas or may be a mixture of methane and at least one of helium, carbon dioxide, hydrogen sulfide, ethane, or nitrogen. In embodiments, the gas stream does not contain a substantial amount of water. In embodiments, the gas stream contains less than 10% by weight water, less than 5% by weight water, less than 1% by weight water, less than 0.1% by weight water, or less than 0.01% by weight water.

Figure 2:
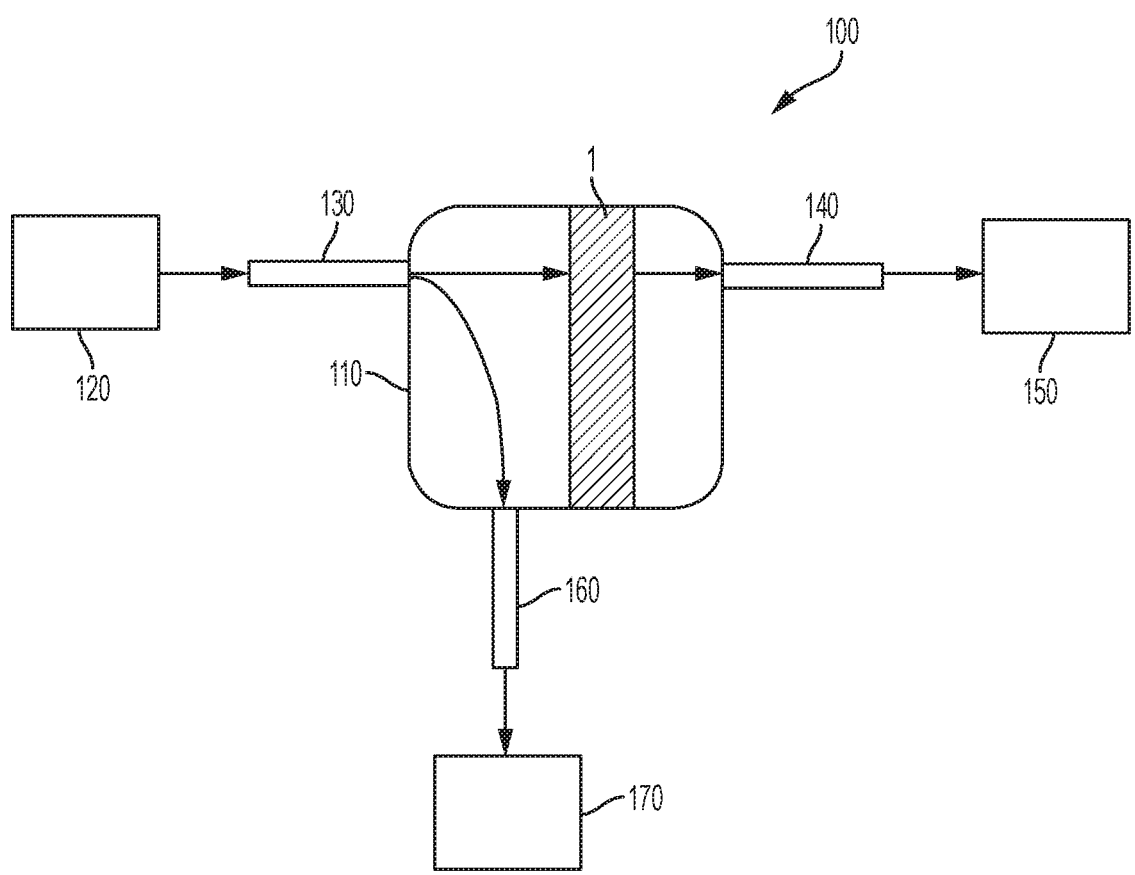
FIG. 2 is a schematic of a system for removing separable gases from gas streams, according to embodiments, including a polymer membrane, according to embodiments.

Referring to the schematic diagram of FIG. 2, the gas separation system 100 for removing separable gases, such as acidic gases, from a gas stream may include a separator unit 110 having comprising an inlet 130, a retentate outlet 160, and a permeate outlet 140. A gas stream 120 may be connected in fluidic communication with the inlet 130 of the separator unit 110, such that a fluid (liquid, gas, or vapor) may flow freely between the gas stream 120 and the inlet 130. In some embodiments, the gas stream 120 comprises a mixture of at least two separable gases, such as natural gas. The gas separation system 100 further includes at least one polymer membrane 1 according to any embodiment of this disclosure, configured within the separator unit 110 to prevent a flow of fluids from the inlet 130 to the permeate outlet 140 without first passing through the at least one polymer membrane 1 and to permit the flow of fluids to proceed from the inlet 130 to the retentate outlet 160 without passing through the at least one polymer membrane 1.

The gas separation system 100 may further include a retentate collector 170 in fluidic communication with the retentate outlet 160 of the separator unit 110. The gas separation system 100 may further include a permeate collector 150 in fluidic communication with the permeate outlet 140 of the separator unit 110. In such a gas separation system 100 including the at least one polymer membrane 1, fluids that reach the permeate collector 150 are acidic gases, relative to the fluids that initially reach the separator unit 110 from the gas stream 120 through the inlet 130. Likewise, fluids that reach the retentate collector 170 have a decreased fraction of acidic gas, relative to the fluids that initially reach the separator unit 110 from the gas stream 120 through the inlet 130.

In some embodiments, the gas stream 120 comprises a mixture of nitrogen ($N_2$), methane ($CH_4$), helium (He), carbon dioxide ($CO_2$), hydrogen sulfide ($H_2S$), and ethane ($C_2H_6$). In other embodiments, the mixture of at least two separable gases comprises methane and at least one of $CO_2$ or He. In additional embodiments, the retentate collector 170 collects retentates comprising $N_2$, $CH_4$, $C_2H_6$, and combinations thereof. In specific embodiments, the permeate collector 150 collected permeates comprising $CO_2$, He, and combinations thereof.

In some embodiments not shown, the gas separation system 100 for removing at least two separable gases from a gas stream may include multiple separator units each having at least one polymer membrane according to embodiments of this disclosure. In other embodiments not shown, the separator unit 110 or multiple separator units may include more than one polymer membrane, each of which may include a polymer material that is the same as or different from that of any other polymer membrane in an individual separator unit or in another separator unit of the system.

It should be understood that the schematic of FIG. 2 is intended to illustrate only a basic configuration of the gas separation system 100 and omits conventional equipment such as compressors, valves, heaters or coolers, fans, circulators, control apparatus, pressure sensors, or the like, which may be implemented in a large-scale system. It should be understood further that many configurations for separator units exist and that the configuration shown is not intended to be limiting. For example, the separator unit may be configured such that the incoming fluid through the inlet enters parallel to the polymer membrane. Further, a carrier gas may be introduced into the separator unit on the side of the polymer membrane opposite the inlet, as a means to facilitate removal of permeate fluids. In such configurations, the carrier gas and the incoming natural gas may flow through the separator unit in a co-flow (same direction) or a counterflow (opposite directions) pathway.

Embodiments of methods for removing separable gases from a gas stream will now be described, with additional reference to FIG. 2. In some embodiments, methods for removing separable gases, such as acidic gases, from a gas stream, such as a natural gas stream, containing methane and an initial volume fraction of the acidic gases, may include introducing the natural gas stream at a feed pressure into a separator unit 110 comprising an inlet 130, a retentate outlet 160, a permeate outlet 140, and at least one polymer membrane 1 according to any embodiment of this disclosure. The at least one polymer membrane 1 may be configured within the separator unit 110 to prevent a flow of fluids from the inlet 130 to the permeate outlet 140 without first passing through the at least one polymer membrane 1 and to permit the flow of fluids to proceed from the inlet 130 to the retentate outlet 160 without passing through the at least one polymer membrane 1.

The methods for removing separable gases from a gas stream may further include collecting at least one of (1) a retentate from the retentate outlet 160, the retentate having a reduced volume fraction of the acidic gases, the reduced volume fraction being less than the initial volume fraction; or (2) a permeate from the permeate outlet 140, the permeate having an increased volume fraction of the acidic gases, the increased volume fraction being greater than the initial volume fraction. The methods may include establishing a feed pressure to the gas stream 120. Examples of a suitable feed pressure may include from 100 psi to 800 psi. In some embodiments, the gas separation system 100 is operable at system pressures of from about 100 psi to about 800 psi, from about 200 psi to about 800 psi, from about 200 psi to about 700 psi, from about 300 psi to about 700 psi, from about 200 psi to about 600 psi, from about 300 psi to about 600 psi, or from about 400 psi to about 800 psi. The methods may include establishing a separation temperature of the separator unit 110. Examples of suitable separation temperatures for separating heavy hydrocarbons from natural gas may include from 20° C. to 100° C.

EXAMPLES

The following examples illustrate one or more additional features of the present disclosure described previously. It should be understood that these examples are not intended to limit the scope of the disclosure or the appended claims in any manner.

In the following examples, polymer membranes were prepared and characterized for their suitability for separating gases. Generally, the polymer membranes were tested by forcing individual gases or gas mixtures through the polymer membranes at pressures ranging from 100 psi to 800 psi and at room temperature. Gas systems tested included both pure gas systems and a mixed gas system. In the pure gas systems, the gas stream was of a single gas at greater than 99.999% purity by weight, particularly one of $CH_4$, $CO_2$, $N_2$, or He. The mixed gas system comprised a mixture of the following gases: $CH_4$, $CO_2$, $N_2$, and $C_2H_6$. Specifically, the mixed gas system consisted of 60.38 vol % $CH_4$, 10.19 vol % $CO_2$, 28.45 vol % $N_2$, and 0.97 vol % $C_2H_6$.

The permeabilities of the polymer membranes toward individual gases were tested, and selectivities of the polymer membranes were calculated from the permeability data of the individual gases. For example, selectivity to $CO_2$ over $CH_4$ was calculated in all instances by dividing the permeability of $CO_2$ at a given upstream feed pressure by the permeability of $CH_4$ at the same upstream feed pressure. Selectivity to He over $CH_4$ was calculated in a similar manner. The permeability and selectivity data indicate the suitability of the polymer membranes for use in gas separation systems such as natural-gas separation systems, for example.

Example 1

Preparation of Polymer Membranes 1-6

Polymer membranes according to formula (I) as previously described are prepared according to the following general method.

A homogenous solution is prepared by dissolving 2.0 g of a fluorinated polytriazole polymer in 100 g of a solvent by magnetic stirring at room temperature for about 24 hours at a temperature of from 25° C. to 100° C. As the fluorinated polytriazole polymer is highly soluble in organic solvents, suitable solvents include chloroform, dichloromethane, trichloroethylene, N-methyl-2-pyrolidone, dimethyl acetamide, dimethyl formamide, dimethyl sulfo oxide, and combinations thereof. The solution is poured into dry, clean glass petri dishes, and the solvent is permitted to evaporate at room temperature over a period of 12 to 24 hours. The solution is then further dried under vacuum at 100° C. for an additional 24 hours to produce a thin-film membrane.

The thin film membranes prepared as described are dense, symmetric, and flat, with a thickness of from about 40 μm to 50 μm. For all membranes described in the following examples, no mass loss due to residual solvent was observed during characterizations of the membranes.

Example 2

Polymer 1 Membrane Characterizations for Pure and Mixed Gas Systems

In this Example, a polymer membrane was prepared according to the procedure of Example 1, in which the fluorinated polytriazole polymer was the 4-bromophenyl substituted Polymer 1, where n was determined to be approximately 114:

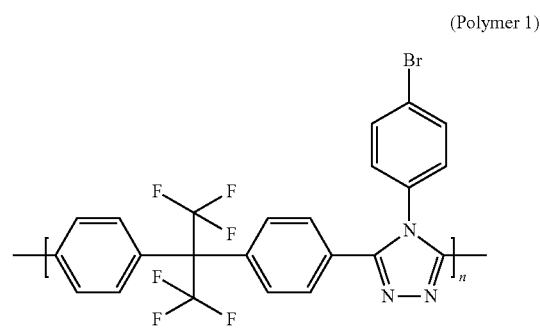

(Polymer 1)

The membrane of Polymer 1 was characterized for both the pure gas systems and mixed gas system, as previously described.

Testing of the pure gas systems was conducted with membranes comprising Polymer 1. Results of this testing are shown in Table 1:

TABLE 1

| Permeability and Selectivity Values of Polymer 1 Tested in the Pure Gas Systems | | | | | | |
|---|---|---|---|---|---|---|
| Upstream Gas Feed Pressure (PSI) | $N_2$ Permeability (Barrer) | $CH_4$ Permeability (Barrer) | He Permeability (Barrer) | $CO_2$ Permeability (Barrer) | He/$CH_4$ Selectivity | $CO_2$/CH4 Selectivity |
| 100 | 1.0 | 1.0 | 76.0 | 55.0 | 76.0 | 55.0 |
| 300 | 1.0 | 1.0 | 75.5 | 54.4 | 75.5 | 54.4 |
| 600 | 1.0 | 1.0 | 75.0 | 54.0 | 75.0 | 54.0 |
| 800 | 1.0 | 1.0 | 74.0 | 52.0 | 74.0 | 52.0 |

The maximum permeabilities of $CO_2$ and He through the membrane of Polymer 1 were at 100 psi. Permeabilities for these gases slightly decreased as the feed pressure was increased to 800 psi.

Testing of the mixed gas system was conducted with membranes comprising Polymer 1. Results of this testing are shown in Table 2:

TABLE 2

| Permeability and Selectivity Values of Polymer 1 Tested in the Mixed Gas System | | | | | |
|---|---|---|---|---|---|
| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2$/$CH_4$ Selectivity |
| 100 | 1.80 | 1.80 | 0.9 | 55.0 | 30.6 |
| 300 | 1.88 | 1.80 | 0.9 | 54.4 | 30.2 |

TABLE 2-continued

Permeability and Selectivity Values
of Polymer 1 Tested in the Mixed Gas System

| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2/CH_4$ Selectivity |
|---|---|---|---|---|---|
| 600 | 3.10 | 1.50 | 1.1 | 49.0 | 32.7 |
| 800 | 3.20 | 1.22 | 1.1 | 46.0 | 37.7 |

The maximum permeabilities of $CO_2$ and $CH_4$ were at 100 psi. The selectivities of $CO_2/CH_4$ increased from 30.6 to 37.7 as the upstream pressure increased from 100 psi to 800 psi.

Example 3

Polymer 2 Membrane Characterizations for Pure and Mixed Gas Systems

In this Example, a polymer membrane was prepared according to the procedure of Example 1, in which the fluorinated polytriazole polymer was the 4-hydroxyphenyl substituted Polymer 2, where n was determined to be approximately 134:

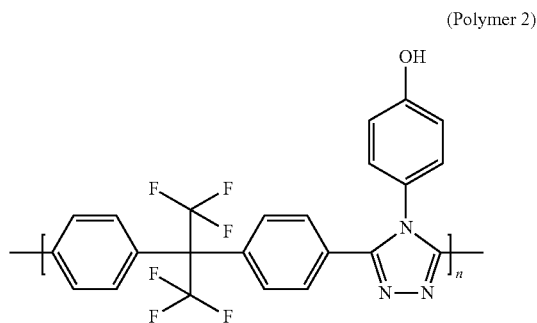

(Polymer 2)

Testing of the pure gas systems was conducted with membranes comprising Polymer 2. Results of this testing are shown in Table 3:

TABLE 3

Permeability and Selectivity Values of Polymer 2 Tested in the Pure Gas Systems

| Upstream Gas Feed Pressure (PSI) | $N_2$ Permeability (Barrer) | $CH_4$ Permeability (Barrer) | He Permeability (Barrer) | $CO_2$ Permeability (Barrer) | $He/CH_4$ Selectivity | $CO_2/CH_4$ Selectivity |
|---|---|---|---|---|---|---|
| 100 | 0.97 | 1.83 | 156 | 79.0 | 85.2 | 43.2 |
| 300 | 0.91 | 1.72 | 146 | 77.0 | 84.9 | 44.7 |
| 600 | 0.85 | 1.60 | 142 | 77.0 | 88.8 | 48.1 |
| 800 | 0.83 | 1.49 | 140 | 77.0 | 94.0 | 51.7 |

Selectivities of the membrane of Polymer 2 increased as the pressure of the feed was increased from 100 psi to 800 psi.

Testing of the mixed gas system was conducted with membranes comprising Polymer 2. Results of this testing are shown in Table 4:

TABLE 4

Permeability and Selectivity Values
of Polymer 2 Tested in the Mixed Gas System

| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2/CH_4$ Selectivity |
|---|---|---|---|---|---|
| 100 | 1.70 | 1.20 | 1.0 | 77 | 64.2 |
| 300 | 2.02 | 1.61 | 1.2 | 69 | 42.9 |
| 600 | 2.39 | 1.90 | 1.3 | 62 | 32.6 |
| 800 | 2.61 | 2.08 | 1.3 | 62 | 29.8 |

For the membrane of Polymer 2, the maximum permeability of $CO_2$ was at 100 psi. However, the permeability value of $CH_4$ increased as the upstream pressure increased from 100 psi to 800 psi. The selectivities of $CO_2/CH_4$ decreased as the upstream pressure increased from 100 psi to 800 psi.

Example 4

Polymer 3 Membrane Characterizations for Pure and Mixed Gas Systems

In this Example, a polymer membrane was prepared according to the procedure of Example 1, in which the fluorinated polytriazole polymer was the 4-fluorophenyl substituted Polymer 3, where n was determined to be approximately 151:

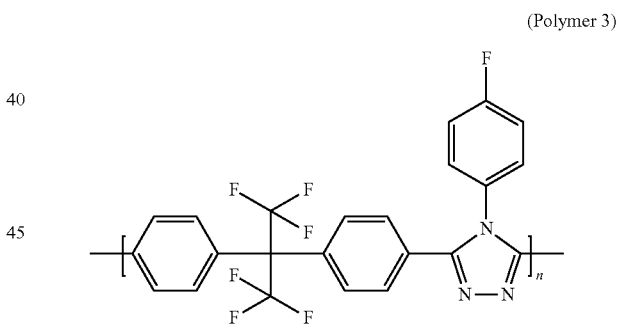

(Polymer 3)

Testing of the pure gas systems was conducted with membranes comprising Polymer 3. Results of this testing are shown in Table 5:

TABLE 5

Permeability and Selectivity Values of Polymer 3 Tested in the Pure Gas Systems

| Upstream Gas Feed Pressure (PSI) | $N_2$ Permeability (Barrer) | $CH_4$ Permeability (Barrer) | He Permeability (Barrer) | $CO_2$ Permeability (Barrer) | $He/CH_4$ Selectivity | $CO_2/CH_4$ Selectivity |
|---|---|---|---|---|---|---|
| 100 | 3.50 | 2.70 | 212 | 132 | 78.5 | 48.9 |
| 300 | 4.25 | 2.71 | 211 | 131 | 77.9 | 48.3 |
| 600 | 4.55 | 4.30 | 211 | 131 | 49.1 | 30.5 |
| 800 | 4.72 | 4.30 | 210 | 125 | 48.8 | 29.1 |

Selectivities of the membrane of Polymer 3 decreased as the pressure of the feed was increased from 100 psi to 800 psi.

Testing of the mixed gas system was conducted with membranes comprising Polymer 3. Results of this testing are shown in Table 6:

TABLE 6

Permeability and Selectivity Values of Polymer 3 Tested in the Mixed Gas System

| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2/CH_4$ Selectivity |
|---|---|---|---|---|---|
| 100 | 3.0 | 2.30 | 1.7 | 113 | 49.1 |
| 300 | 3.0 | 2.71 | 2.7 | 104 | 38.4 |
| 600 | 3.5 | 3.00 | 2.0 | 90 | 30.0 |
| 800 | 3.5 | 3.10 | 2.1 | 88 | 28.4 |

The maximum permeability of the membrane of Polymer 3 to $CO_2$ was at 100 psi. However, the permeability of $CH_4$ increased as the upstream pressure increased from 100 psi to 800 psi. The selectivities of $CO_2/CH_4$ decreased as the upstream pressure increased from 100 psi to 800 psi.

Example 5

Polymer 4 Membrane Characterizations for Pure and Mixed Gas Systems

In this Example, a polymer membrane was prepared according to the procedure of Example 1, in which the fluorinated polytriazole polymer was the 4-(difluoromethyl) phenyl substituted Polymer 4, where n was determined to be approximately 127:

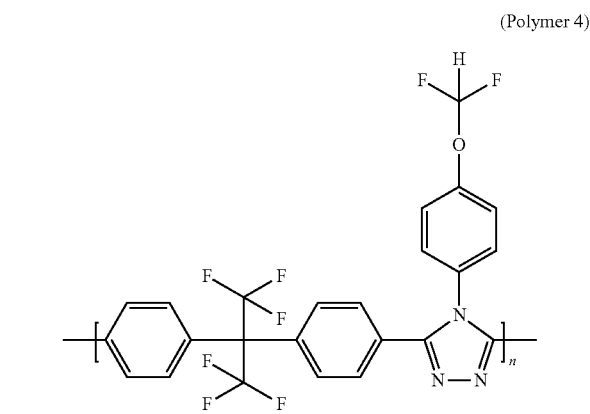

(Polymer 4)

Testing of the pure gas systems was conducted with membranes comprising Polymer 4. Results of this testing are shown in Table 7:

TABLE 7

Permeability and Selectivity Values of Polymer 4 Tested in the Pure Gas Systems

| Upstream Gas Feed Pressure (PSI) | $N_2$ Permeability (Barrer) | $CH_4$ Permeability (Barrer) | He Permeability (Barrer) | $CO_2$ Permeability (Barrer) | $He/CH_4$ Selectivity | $CO_2/CH_4$ Selectivity |
|---|---|---|---|---|---|---|
| 100 | 2.50 | 1.6 | 132 | 113 | 82.5 | 70.6 |
| 300 | 2.38 | 1.8 | 130 | 111 | 72.2 | 61.7 |
| 600 | 2.20 | 2.0 | 121 | 95 | 60.5 | 47.5 |
| 800 | 2.00 | 2.0 | 113 | 83 | 56.5 | 41.5 |

For the membrane of Polymer 4, selectivities of both He and $CO_2$ over $CH_4$ decreased as the pressure of the feed was increased from 100 psi to 800 psi.

Testing of the mixed gas system was conducted with membranes comprising Polymer 4. Results of this testing are shown in Table 8:

TABLE 8

Permeability and Selectivity Values of Polymer 4 Tested in the Mixed Gas System

| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2/CH_4$ Selectivity |
|---|---|---|---|---|---|
| 100 | 3.3 | 2.4 | 0.69 | 93 | 38.8 |
| 300 | 3.3 | 2.4 | 0.68 | 90 | 37.5 |
| 600 | 3.2 | 2.1 | 0.69 | 75 | 35.7 |
| 800 | 3.1 | 2.0 | 0.69 | 71 | 35.5 |

For the membrane of Polymer 4, maximum permeabilities of CO$_2$ and CH$_4$ were at 100 psi. The selectivities of CO$_2$/CH$_4$ slightly decreased as the upstream pressure increased from 100 psi to 800 psi.

Example 6

Polymer 5 Membrane Characterizations for Pure and Mixed Gas Systems

In this Example, a polymer membrane was prepared according to the procedure of Example 1, in which the fluorinated polytriazole polymer was the 2,3,4,5,6-pentafluorobenzenamino substituted Polymer 5, where n was determined to be approximately 112:

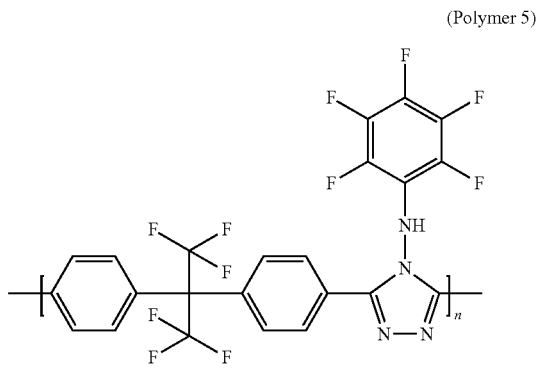

(Polymer 5)

Testing of the pure gas systems was conducted with membranes comprising Polymer 5. Results of this testing are shown in Table 9:

TABLE 9

Permeability and Selectivity Values of Polymer 5 Tested in the Pure Gas Systems

| Upstream Gas Feed Pressure (PSI) | N$_2$ Permeability (Barrer) | CH$_4$ Permeability (Barrer) | He Permeability (Barrer) | CO$_2$ Permeability (Barrer) | He/CH$_4$ Selectivity | CO$_2$/CH$_4$ Selectivity |
|---|---|---|---|---|---|---|
| 100 | 0.60 | 0.75 | 95 | 36 | 126.7 | 48.0 |
| 300 | 0.66 | 0.75 | 94 | 35 | 125.3 | 46.7 |
| 600 | 1.00 | 0.77 | 93 | 31 | 120.8 | 40.3 |
| 800 | 1.30 | 0.85 | 92 | 25 | 108.2 | 29.4 |

For the membrane of Polymer 5, selectivities of both He and CO$_2$ over CH$_4$ decreased as the pressure of the feed was increased from 100 psi to 800 psi.

Testing the mixed gas system was conducted with membranes comprising Polymer 5. Results of this testing are shown in Table 10:

TABLE 10

Permeability and Selectivity Values of Polymer 5 Tested in the Mixed Gas System

| Upstream Gas Feed Pressure (PSI) | N$_2$ Permeability (Barrer) | CH$_4$ Permeability (Barrer) | C$_2$H$_6$ Permeability (Barrer) | CO$_2$ Permeability (Barrer) | CO$_2$/CH$_4$ Selectivity |
|---|---|---|---|---|---|
| 100 | 0.30 | 0.55 | 0.40 | 18 | 32.7 |
| 300 | 0.33 | 0.51 | 0.41 | 16 | 31.4 |
| 600 | 0.33 | 0.43 | 0.46 | 12 | 27.9 |
| 800 | 0.28 | 0.39 | 0.53 | 10 | 25.6 |

For the membrane of Polymer 5, maximum permeabilities of CO$_2$ and CH$_4$ were at 100 psi. The selectivities of CO$_2$/CH$_4$ slightly decreased as the upstream pressure increased from 100 psi to 800 psi.

Example 7

Polymer 5 Membrane Characterizations for Pure and Mixed Gas Systems

In this Example, a polymer membrane was prepared according to the procedure of Example 1, in which the fluorinated polytriazole polymer was the 4-bromo-2,3,5,6-tetrafluorophenyl substituted Polymer 6, where n was determined to be approximately 108:

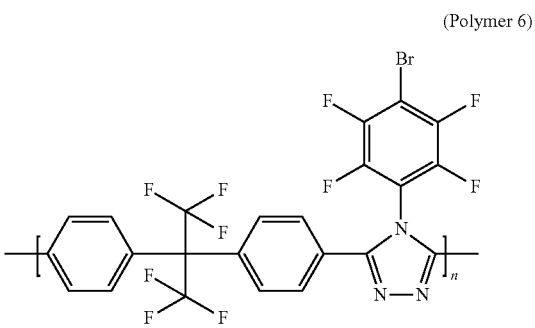

(Polymer 6)

Testing of the pure gas systems was conducted with membranes comprising Polymer 6. Results of this testing are shown in Table 11:

TABLE 11

Permeability and Selectivity Values of Polymer 6 Tested in the Pure Gas Systems

| Upstream Gas Feed Pressure (PSI) | $N_2$ Permeability (Barrer) | $CH_4$ Permeability (Barrer) | He Permeability (Barrer) | $CO_2$ Permeability (Barrer) | $He/CH_4$ Selectivity | $CO_2/CH_4$ Selectivity |
|---|---|---|---|---|---|---|
| 100 | 2.00 | 1.50 | 177 | 60.0 | 118.0 | 40.0 |
| 300 | 1.25 | 1.56 | 178 | 58.0 | 114.1 | 37.2 |
| 600 | 1.20 | 1.83 | 188 | 55.5 | 102.7 | 30.3 |
| 800 | 1.10 | 2.10 | 201 | 55.0 | 95.7 | 26.2 |

For the membrane of Polymer 6, selectivities of both He and $CO_2$ over $CH_4$ decreased as the pressure of the feed was increased from 100 psi to 800 psi.

Testing of the mixed gas system was conducted with membranes comprising Polymer 6. Results of this testing are shown in Table 12:

TABLE 12

Permeability and Selectivity Values of Polymer 6 Tested in the Mixed Gas System

| Upstream Gas Feed Pressure (PSI) | $N_2$ Permeability (Barrer) | $CH_4$ Permeability (Barrer) | $C_2H_6$ Permeability (Barrer) | $CO_2$ Permeability (Barrer) | $CO_2/CH_4$ Selectivity |
|---|---|---|---|---|---|
| 100 | 1.00 | 1.3 | 1.20 | 55.0 | 42.3 |
| 300 | 0.90 | 1.5 | 1.10 | 55.0 | 36.7 |
| 600 | 0.71 | 1.8 | 0.91 | 50.0 | 27.8 |
| 800 | 0.71 | 2.5 | 0.88 | 46.7 | 18.7 |

For the membrane of Polymer 6, the maximum permeability of $CO_2$ was at 100 psi. However, the permeability of $CH_4$ increased as the upstream pressure increased from 100 psi to 800 psi. The selectivities of $CO_2/CH_4$ decreased as the upstream pressure increased from 100 psi to 800 psi.

Example 8

Thermal and Physical Properties of Polymers 1-6

Various properties of Polymers 1-6 as described in Examples 2-7 were determined. The average molecular weight ($M_w$) of the polymers was determined by size exclusion chromatography to be between 60 kg/mol and 70 kg/mol. Polydispersity indices (PDI) for Polymers 1-6 were also determined to be in the range of 2.2 to 2.6. Polymers 1-6 displayed a degree of polymerization between 108 and 151. The degree of polymerization was calculated by dividing the molecular weight ($M_w$) of the entire polymer by the molecular weight ($M_w$) of the individual polymer unit.

The thermal stability of Polymers 1-6 were analyzed by thermogravimetric analysis (TGA). All of the polymers showed a 5 wt % loss within the temperature range of between 485° C. and 495° C. The char (percent residue) left at 650° C. ranged from 46% to 60%.

Table 13 summarizes the thermal and physical properties for all tested polymers.

TABLE 13

Thermal and Physical Properties of Polymers 1-6

| Polymer Identification | Molecular Weight ($M_w$) (kg/mol) | Polydispersity Value ($M_w/M_n$) | Degree of Polymerization (Units) | Degradation Temperature at 5% weight loss of $N_2$ (° C.) | Char Residue Remaining at 650° C. (%) |
|---|---|---|---|---|---|
| Polymer 1 | 60 | 2.6 | 114 | 485 | 53 |
| Polymer 2 | 62 | 2.5 | 134 | 490 | 60 |
| Polymer 3 | 70 | 2.2 | 151 | 491 | 60 |
| Polymer 4 | 65 | 2.3 | 127 | 495 | 56 |
| Polymer 5 | 62 | 2.2 | 112 | 490 | 50 |
| Polymer 6 | 65 | 2.3 | 108 | 488 | 46 |

Anti-Plasticization Properties of Polymer Membranes 1-6

Figure 3:
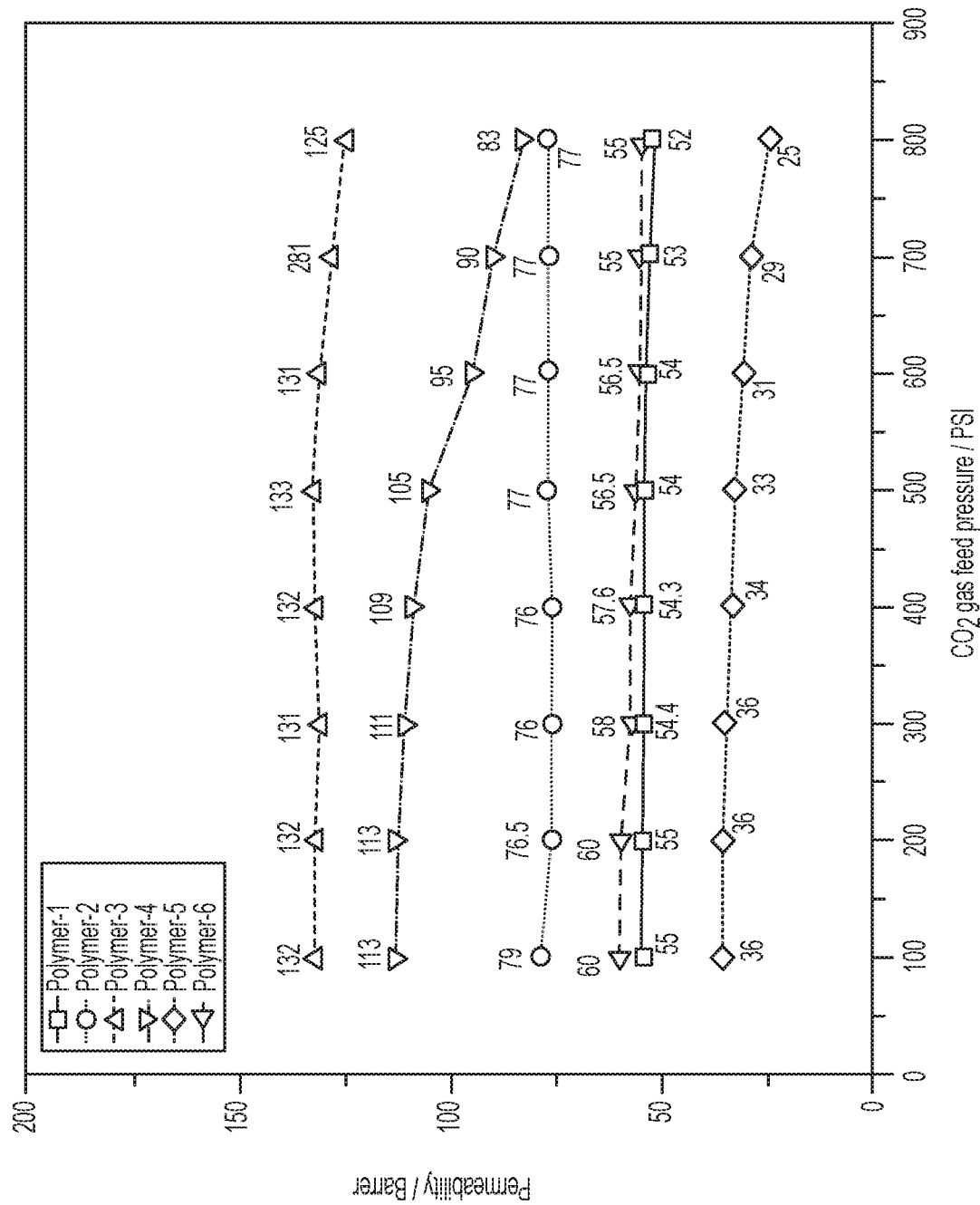
FIG. 3 is a graph of $CO_2$ permeability of a polymer membrane according to an embodiment at 25° C., over a feed pressure range of 100 psi to 800 psi.

The permeability values of $CO_2$ gas obtained from the pure gas testing of membranes comprising Polymers 1-6 remained constant, or slightly decreased, as the upstream feed pressure was increased from 100 psi to 800 psi. Such permeability results indicate that the polymer membranes did not swell or dilate in the harsh, acidic $CO_2$-rich environment provided by the pure gas testing. These anti-plasticization properties indicate that the membranes provide both excellent mechanical and chemical stability in high-pressure environments. Moreover, no defect due to dilation or swelling of the polymer membranes was observed during either the pure gas testing or the mixed gas testing. Based on such properties, these polymer materials may be considered as promising materials for high-pressure processing of natural gas. These anti-plasticization properties are shown in FIG. 3.

Trade-Off Relationship of Polymer Membranes 1-6

The Robeson Curve, which was first reported in 1991 and again in 2008, demonstrates the correlation of separation factor versus permeability for polymeric membranes. (see Lloyd M. Robeson, *Correlation of separation factor versus permeability for polymeric membranes*, Journal of Membrane Science, 62 (1991), Elsevier Science Publishers BV, pp. 161-85; Lloyd M. Robeson, *The upper bound revisited*, Journal of Membrane Science, 320 (2008), Elsevier Science Publishers BV, pp. 390-400). In the Robeson works, the permeability and selectivity values were selected for comparison, but independently of applied pressure. The results indicate that the diffusion coefficient governs the separating capabilities of polymers. Further, the Robseon results show an upper-bound relationship for membrane separation of binary gas mixtures selected from He, $H_2$, $O_2$, $N_2$, $CH_4$, and $CO_2$.

Thus, as demonstrated through the Robeson curves, a trade-off relationship exists between permeability and selectivity values of $CO_2$ when filtered with polymer membrane materials. This relationship demonstrates that as permeability values of $CO_2$ increase, the selectivity values of $CO_2$/$CH_4$ decrease. In other words, an inversely proportional relationship exists between permeability and selectivity values for gas-separation membranes.

Figure 4:
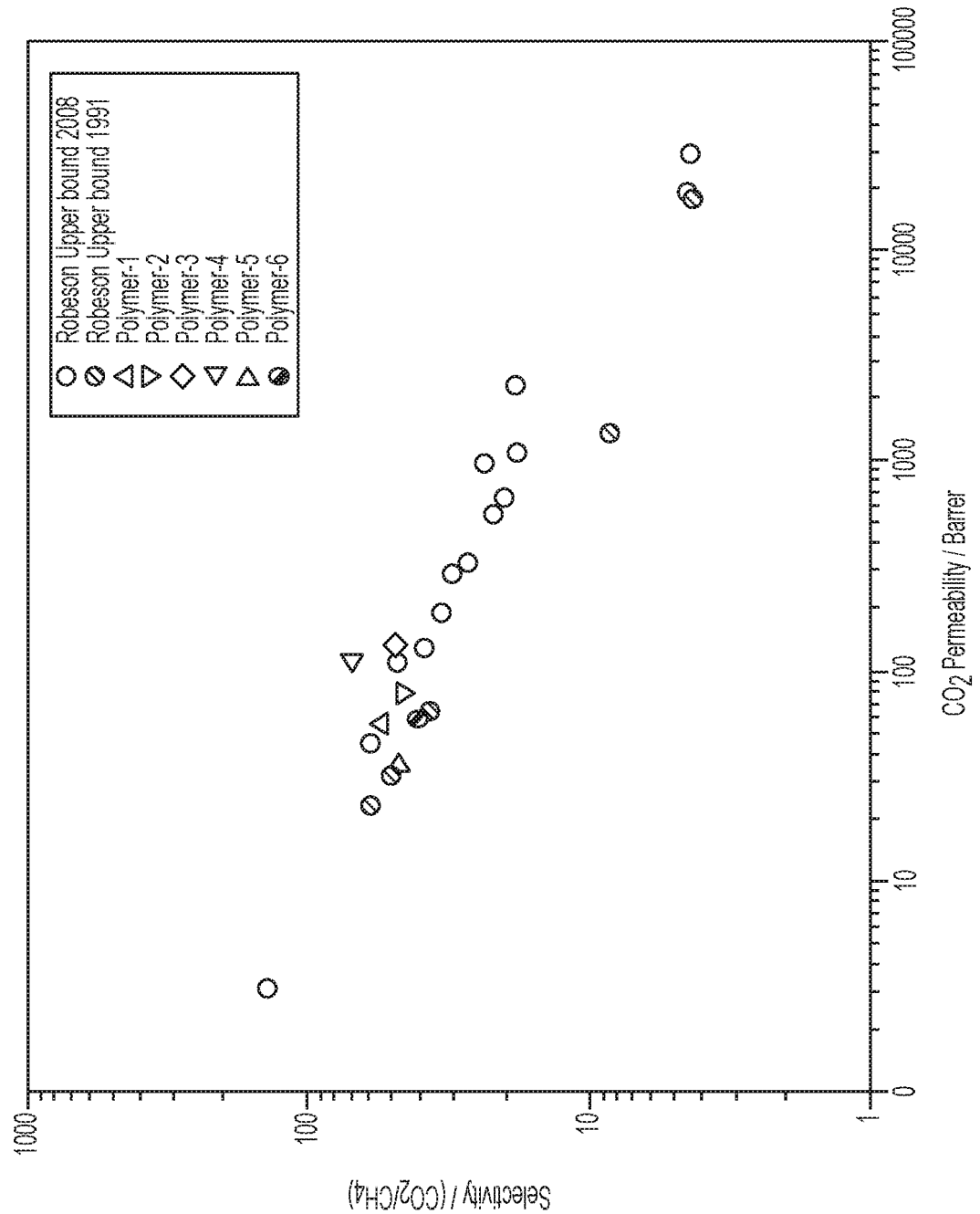
FIG. 4 is a graph of $CO_2$ permeability versus $CO_2/CH_4$ ideal selectivity for a polymer membrane according to an embodiment, in comparison to the Robeson Curve.

The data reported in Examples 1-7 of this disclosure evidence that both the permeability and selectivity values for membranes comprising Polymers 3 and 4 are more favorable than the Robeson Curve. Therefore, these polymers may be suitable for gas separation and for the removal of $CO_2$ gas from a natural-gas stream during high-pressure processing. FIG. 4 shows the trade-off relationship of polymer membranes 1-6 in comparison to the Robeson Curve. The data with respect to comparative polymer membranes are drawn from the Robeson papers, for which all such membranes were subjected to additional various treatments, such as blending and UV treatment. These treatments are time intensive, monetarily expensive, and require additional safety precautions. In contrast, membranes comprising Polymers 1-6 require no additional treatment to produce comparable results.

The present disclosure is directed to at least one of the following aspects.

Aspect 1: A gas separation system comprising a polymer membrane in fluidic communication with a gas stream containing a mixture of at least two separable gases, the polymer membrane comprising a fluorinated polytriazole polymer according to formula (I), as described in this disclosure, in which each $R^1$ is a substituted phenyl according to formula (Ia) as described in this disclosure or a substituted benzenaminyl according to formula (Ib) as described in this disclosure, where $X^1$, $X^2$, $X^3$, $X^4$, and $X^5$ of formula (Ia) and formula (Ib) are independently selected from hydrogen, bromo, fluoro, chloro, iodo, hydroxy, methyl, trifluoromethyl, dimethylamino, tert-butyl, or difluoromethoxy, provided at least one of $X^1$, $X^2$, $X^3$, $X^4$, or $X^5$ is not hydrogen; and n is from 100 to 175.

Aspect 2: The gas separation system of Aspect 1, wherein exactly one of $X^1$, $X^2$, $X^3$, $X^4$, and $X^5$ is independently selected from, bromo, fluoro, chloro, iodo, hydroxy, methyl, trifluoromethyl, dimethylamino, tert-butyl, or difluoromethoxy, and the remaining four of $X^1$-$X^5$ are hydrogen.

Aspect 3: The gas separation system of any of Aspects 1 or 2, wherein exactly two of $X^1$, $X^2$, $X^3$, $X^4$, and $X^5$ are independently selected from bromo, fluoro, chloro, iodo, hydroxy, methyl, trifluoromethyl, dimethylamino, tert-butyl, or difluoromethoxy, and the remaining three of $X^1$-$X^5$ are hydrogen.

Aspect 4: The gas separation system of any of the preceding aspects, where $X^1$, $X^2$, $X^3$, $X^4$, and $X^5$ are independently selected from the group consisting of hydrogen, bromo, and fluoro, provided at least one of $X^1$, $X^2$, $X^3$, $X^4$, or $X^5$ is not hydrogen.

Aspect 5: The gas separation system of any of the preceding aspects, wherein each $R^1$ is selected from the group consisting of 4-bromophenyl; 4-fluorophenyl; 4-hydroxyphenyl; 4-(difluoromethyl)phenyl; 2,3,4,5,6-pentafluorobenzenaminyl; 1,2,3,4,5-(pentafluoro)phenyl; 4-bromo-2,3,5,6-tetrafluorophenyl; 4-bromo-2,5-difluorophenyl; 4-bromo-2,6-difluorophenyl; 2,4-difluorophenyl; 2,5-difluorophenyl; 3-(trifluoromethyl)phenyl; 4-fluoro-3-(trifluoromethyl)phenyl; 4-tert-butylphenyl; 2,4,6-trimethylphenyl; and 4-(dimethylamino)phenyl.

Aspect 6: The gas separation system of any of the preceding aspects, wherein each $R^1$ is selected from the group consisting of 4-bromophenyl; 4-fluorophenyl; 4-hydroxyphenyl; 4-(difluoromethyl)phenyl; 2,3,4,5,6-pentafluorobenzenaminyl; and 4-bromo-2,3,5,6-tetrafluorophenyl.

Aspect 7: The gas separation system of any of the preceding aspects, wherein each $R^1$ is selected from the group consisting of 4-bromophenyl; 4-fluorophenyl; 4-(difluoromethyl)phenyl; 2,3,4,5,6-pentafluorobenzenaminyl; and 4-bromo-2,3,5,6-tetrafluorophenyl.

Aspect 8: The gas separation system of any of the preceding aspects, wherein each $R^1$ is a substituted phenyl according to formula (Ia).

Aspect 9: The gas separation system of any of the preceding aspects, wherein $R^1$ is selected from the group consisting of 4-bromophenyl; 4-fluorophenyl; 4-hydroxyphenyl; 4-(difluoromethyl)phenyl; 4-bromo-2,3,5,6-tetrafluorophenyl; 4-bromo-2,5-difluorophenyl; 4-bromo-2,6-difluorophenyl; 2,4-difluorophenyl; 2,5-difluorophenyl; 3-(trifluoromethyl)phenyl; 4-fluoro-3-(trifluoromethyl)phenyl; 4-tert-butylphenyl; 2,4,6-trimethylphenyl; and 4-(dimethylamino)phenyl.

Aspect 10: The gas separation system of any of the preceding aspects, wherein each $R^1$ is a substituted benzenaminyl according to formula (Ib).

Aspect 11: The gas separation system of any of the preceding aspects, wherein $R^1$ is selected from the group consisting of 2,3,4,5,6-pentafluorobenzenaminyl; 2,4,6-trimethylbenzenaminyl hydrochloride; 2,6-dichloro-4-(trifluoromethyl)benzenaminyl; 3,5-bis(trifluoromethyl)benzenaminyl; and 4-(hexadecylsulfonyl)benzenaminyl.

Aspect 12: The gas separation system of any of the preceding aspects, wherein the polymer membrane has an average molecular weight of 50 kg/mol to 75 kg/mol, as determined by size exclusion chromatography.

Aspect 13: The gas separation system of any of the preceding aspects, the system comprising: a separator unit having an inlet, a retentate outlet, and a permeate outlet; a gas stream in fluidic communication with the inlet of the separator unit, the gas stream comprising a mixture of at least two separable gases; at least one polymer membrane according to claim 1 configured within the separator unit such that only permeates can flow from the inlet to the permeate outlet after first passing through the membrane and such that retentates flow from the inlet to the retentate outlet without passing through the membrane; a retentate collector in fluidic communication with the retentate outlet of the separator unit; and a permeate collector in fluidic communication with the permeate outlet of the separator unit.

Aspect 14: The gas separation system of Aspect 13, wherein the gas stream comprises a mixture of nitrogen ($N_2$), methane ($CH_4$), helium (He), carbon dioxide ($CO_2$), hydrogen sulfide ($H_2S$), and ethane ($C_2H_6$).

Aspect 15: The gas separation system of any of Aspects 13 or 14, wherein the gas stream is natural gas.

Aspect 16: The gas separation system of any of Aspects 13 to 15, wherein the mixture of at least two separable gases comprises methane and at least one of carbon dioxide or helium.

Aspect 17: The gas separation system of any of Aspects 13 to 16, wherein the retentates are $N_2$, $CH_4$, $C_2H_6$, and combinations thereof.

Aspect 18: The gas separation system of any of Aspects 13 to 17, wherein the permeates are $CO_2$, He, and combinations thereof.

Aspect 19: The gas separation system of any of Aspects 13 to 18, wherein the gas stream is natural gas; the retentates comprise $CH_4$ and optionally one or more of $N_2$ or $C_2H_6$; and the permeates comprise $CO_2$, He, or combinations thereof.

Aspect 20: The gas separation system of any of Aspects 13 to 19, wherein the system is operable to separate methane and at least one of carbon dioxide or helium at system pressures of from about 100 psi to about 800 psi.

Aspect 21: The gas separation system of any of Aspects 13 to 20, wherein the permeability of the permeates decreases as the pressure of the system is increased from about 100 psi to about 800 psi as the permeates pass through the membrane.

Aspect 22: The gas separation system of any of Aspects 13 to 21, wherein the membrane has a carbon dioxide to methane selectivity of at least 32.

Aspect 23: The gas separation system of any of Aspects 13 to 22, wherein the membrane has a helium to methane selectivity of at least 82.

Aspect 24: The gas separation system of any of Aspects 13 to 23, wherein the membrane has a helium to methane selectivity of at least 82 and a carbon dioxide to methane selectivity of at least 32.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. A gas separation system comprising a polymer membrane in fluidic communication with a gas stream containing a mixture of at least two separable gases, the polymer membrane comprising a fluorinated polytriazole polymer according to formula (I):

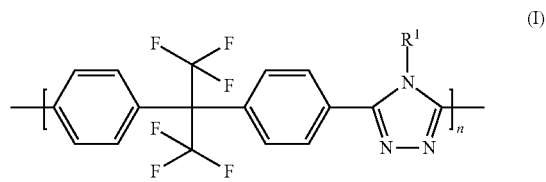

where:
each $R^1$ is a substituted phenyl according to formula (Ia) or a substituted benzenaminyl according to formula (Ib):

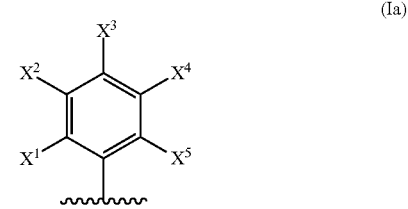

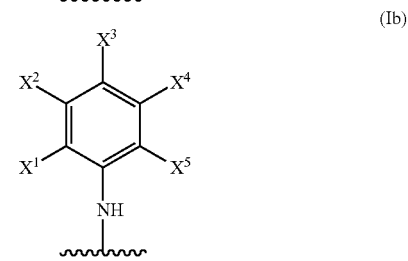

where $X^1$, $X^2$, $X^3$, $X^4$, and $X^5$ of formula (Ia) and formula (Ib) are independently selected from hydrogen, bromo, fluoro, chloro, iodo, hydroxy, methyl, trifluoromethyl, dimethylamino, tert-butyl, or difluoromethoxy, provided at least one of $X^1$, $X^2$, $X^3$, $X^4$, or $X^5$ is not hydrogen; and
n is from 100 to 175.

2. The gas separation system of claim 1, wherein exactly one of $X^1$, $X^2$, $X^3$, $X^4$, and $X^5$ is independently selected from, bromo, fluoro, chloro, iodo, hydroxy, methyl, trifluoromethyl, dimethylamino, tert-butyl, or difluoromethoxy, and the remaining four of $X^1 X^5$ are hydrogen.

3. The gas separation system of claim 1, wherein exactly two of $X^1$, $X^2$, $X^3$, $X^4$, and $X^5$ are independently selected from bromo, fluoro, chloro, iodo, hydroxy, methyl, trifluoromethyl, dimethylamino, tert-butyl, or difluoromethoxy, and the remaining three of $X^1$-$X^5$ are hydrogen.

4. The gas separation system of claim 1, where $X^1$, $X^2$, $X^3$, $X^4$, and $X^5$ are independently selected from the group consisting of hydrogen, bromo, and fluoro, provided at least one of $X^1$, $X^2$, $X^3$, $X^4$, or $X^5$ is not hydrogen.

5. The gas separation system of claim 1, wherein each $R^1$ is selected from the group consisting of 4-bromophenyl;

4-fluorophenyl; 4-hydroxyphenyl; 4-(difluoromethyl)phenyl; 2,3,4,5,6-pentafluorobenzenaminyl; 1,2,3,4,5-(pentafluoro)phenyl; 4-bromo-2,3,5,6-tetrafluorophenyl; 4-bromo-2,5-difluorophenyl; 4-bromo-2,6-difluorophenyl; 2,4-difluorophenyl; 2,5-difluorophenyl; 3-(trifluoromethyl) phenyl; 4-fluoro-3-(trifluoromethyl)phenyl; 4-tert-butylphenyl; 2,4,6-trimethylphenyl; and 4-(dimethylamino)phenyl.

6. The gas separation system of claim 1, wherein each $R^1$ is selected from the group consisting of 4-bromophenyl; 4-fluorophenyl; 4-hydroxyphenyl; 4-(difluoromethyl)phenyl; 2,3,4,5,6-pentafluorobenzenaminyl; and 4-bromo-2,3,5,6-tetrafluorophenyl.

7. The gas separation system of claim 1, wherein each $R^1$ is selected from the group consisting of 4-bromophenyl; 4-fluorophenyl; 4-(difluoromethyl)phenyl; 2,3,4,5,6-pentafluorobenzenaminyl; and 4-bromo-2,3,5,6-tetrafluorophenyl.

8. The gas separation system of claim 1, wherein each $R^1$ is a substituted phenyl according to formula (Ia).

9. The gas separation system of claim 8, wherein $R^1$ is selected from the group consisting of 4-bromophenyl; 4-fluorophenyl; 4-hydroxyphenyl; 4-(difluoromethyl)phenyl; 4-bromo-2,3,5,6-tetrafluorophenyl; 4-bromo-2,5-difluorophenyl; 4-bromo-2,6-difluorophenyl; 2,4-difluorophenyl; 2,5-difluorophenyl; 3-(trifluoromethyl)phenyl; 4-fluoro-3-(trifluoromethyl)phenyl; 4-tert-butylphenyl; 2,4,6-trimethylphenyl; and 4-(dimethylamino)phenyl.

10. The gas separation system of claim 1, wherein each $R^1$ is a substituted benzenaminyl according to formula (Ib).

11. The gas separation system of claim 10, wherein $R^1$ is selected from the group consisting of 2,3,4,5,6-pentafluorobenzenaminyl; 2,4,6-trimethylbenzenaminyl hydrochloride; 2,6-dichloro-4-(trifluoromethyl)benzenaminyl; 3,5-bis(trifluoromethyl)benzenaminyl; and 4-(hexadecylsulfonyl) benzenaminyl.

12. The gas separation system of claim 1, wherein the polymer membrane has an average molecular weight of 50 kg/mol to 75 kg/mol, as determined by size exclusion chromatography.

13. The gas separation system of claim 1, the system comprising:
   a separator unit having an inlet, a retentate outlet, and a permeate outlet;
   a gas stream in fluidic communication with the inlet of the separator unit, the gas stream comprising a mixture of at least two separable gases;
   at least one polymer membrane according to claim 1 configured within the separator unit such that only permeates can flow from the inlet to the permeate outlet after first passing through the membrane and such that retentates flow from the inlet to the retentate outlet without passing through the membrane;
   a retentate collector in fluidic communication with the retentate outlet of the separator unit; and
   a permeate collector in fluidic communication with the permeate outlet of the separator unit.

14. The system of claim 13, wherein the gas stream comprises a mixture of nitrogen ($N_2$), methane ($CH_4$), helium (He), carbon dioxide ($CO_2$), hydrogen sulfide ($H_2S$), and ethane ($C_2H_6$).

15. The system of claim 13, wherein the gas stream is natural gas.

16. The system of claim 13, wherein the mixture of at least two separable gases comprises methane and at least one of carbon dioxide or helium.

17. The system of claim 13, wherein the retentates are $N_2$, $CH_4$, $C_2H_6$, and combinations thereof.

18. The system of claim 13, wherein the permeates are $CO_2$, He, and combinations thereof.

19. The system of claim 13, wherein:
   the gas stream is natural gas;
   the retentates comprise $CH_4$ and optionally one or more of $N_2$ or $C_2H_6$; and
   the permeates comprise $CO_2$, He, or combinations thereof.

20. The system of claim 13, wherein the system is operable to separate methane and at least one of carbon dioxide or helium at system pressures of from about 100 psi to about 800 psi.

21. The system of claim 13, wherein the permeability of the permeates decreases as the pressure of the system is increased from about 100 psi to about 800 psi as the permeates pass through the membrane.

22. The system of claim 13, wherein the membrane has a carbon dioxide to methane selectivity of at least 32.

23. The system of claim 13, wherein the membrane has a helium to methane selectivity of at least 82.

24. The system of claim 13, wherein the membrane has a helium to methane selectivity of at least 82 and a carbon dioxide to methane selectivity of at least 32.

\* \* \* \* \*

UNITED STATES PATENT AND TRADEMARK OFFICE
CERTIFICATE OF CORRECTION

PATENT NO. : 10,919,002 B2
APPLICATION NO. : 16/114676
DATED : February 16, 2021
INVENTOR(S) : Husnul Maab and Eyad A. Qasem Page 1 of 1

It is certified that error appears in the above-identified patent and that said Letters Patent is hereby corrected as shown below:

In the Specification

In Column 3, Line(s) 10, delete "a," and insert --α,--, therefor.

In the Claims

In Column 22, Claim 2, Line(s) 56, delete "$X^1X^5$" and insert --$X^1$-$X^5$--, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*